(12) United States Patent
Mazur et al.

(10) Patent No.: US 11,599,096 B2
(45) Date of Patent: Mar. 7, 2023

(54) SYSTEMS AND METHODS FOR AUTOMATIC COMMISSIONING OF AN INDUSTRIAL DEVICE ASSEMBLY

(71) Applicant: ROCKWELL AUTOMATION TECHNOLOGIES, INC., Mayfield Heights, OH (US)

(72) Inventors: David C. Mazur, Mequon, WI (US); Roberto S. Marques, Cedarburg, WI (US); Andrew J. Schaeffler, Whitefish Bay, WI (US); Rob Alan Entzminger, Shawnee, KS (US); Mithun Mohan Nagabhairava, Waukegan, IL (US); Calvin C. Steinweg, Hartford, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 193 days.

(21) Appl. No.: 16/741,561

(22) Filed: Jan. 13, 2020

(65) Prior Publication Data
US 2021/0216061 A1  Jul. 15, 2021

(51) Int. Cl.
  *G05B 19/418* (2006.01)
  *G05B 19/414* (2006.01)
(52) U.S. Cl.
  CPC ..... *G05B 19/4185* (2013.01); *G05B 19/4148* (2013.01); *G05B 2219/23067* (2013.01)
(58) Field of Classification Search
  CPC ............ G05B 19/4185; G05B 19/4148; G05B 2219/23067; G05B 19/0426;
  (Continued)

(56) References Cited

U.S. PATENT DOCUMENTS

| 2003/0041133 A1* | 2/2003 | Hiroshige | G06F 9/44505 709/222 |
| 2006/0026193 A1* | 2/2006 | Hood | G05B 19/0426 |

(Continued)

FOREIGN PATENT DOCUMENTS

EP  1380908 A2  1/2004

OTHER PUBLICATIONS

Extended European Search Report for EP App. No. 21151133.2 dated Jun. 1, 2021, 10 pages.

*Primary Examiner* — Kenneth M Lo
*Assistant Examiner* — Mohammed Shafayet
(74) *Attorney, Agent, or Firm* — Fletcher Yoder, P.C.

(57) ABSTRACT

A system has a processor that may receive an order of an industrial device assembly having multiple industrial automation devices. The processor may also generate a first data file based on the order of the industrial device assembly. The first data file may have specification data associated with each industrial automation device and hierarchical information associated with each industrial automation device. Additionally, the processor may generate a second data file based on the first data file. The second data file has one or more control blocks of code associated with each industrial automation device. Further, the processor may transmit the second data file to a control system associated with the industrial device assembly. The control system is automatically programmed based on the second data file to control one or more operations of each industrial automation device in the industrial device assembly.

20 Claims, 4 Drawing Sheets

(58) Field of Classification Search
CPC .... G05B 19/41865; G05B 2219/32252; G06F 9/44505
USPC ........................................................ 706/83
See application file for complete search history.

(56) References Cited

U.S. PATENT DOCUMENTS

| | | | |
|---|---|---|---|
| 2006/0100934 A1* | 5/2006 | Burr ................... | G06Q 30/0635 705/26.81 |
| 2013/0007693 A1* | 1/2013 | Bliss ..................... | G05B 19/04 717/101 |
| 2015/0120014 A1* | 4/2015 | Okubo ............... | G05B 19/4185 700/87 |
| 2015/0248122 A1* | 9/2015 | Norwood ............... | G06Q 50/04 700/87 |
| 2016/0274553 A1* | 9/2016 | Strohmenger ......... | G05B 17/02 |
| 2018/0136637 A1* | 5/2018 | Bodanapu ............... | G06F 30/18 |
| 2018/0231959 A1* | 8/2018 | Jundt ................. | G05B 23/0224 |

\* cited by examiner

SYSTEMS AND METHODS FOR AUTOMATIC COMMISSIONING OF AN INDUSTRIAL DEVICE ASSEMBLY

BACKGROUND

The present disclosure relates generally to automatically commissioning industrial device assemblies. More specifically, the present disclosure relates to a controller of an industrial device assembly that provides for subsequent automatic commissioning of the industrial equipment.

Industrial systems may include various types of industrial device assemblies, such as motor control centers (MCCs), switchgear assemblies, and the like. Such industrial device assemblies are typically custom ordered from a manufacturer for a particular industrial site. Before submitting the order for a particular industrial device assembly, the customer may define specifications of the industrial device assembly and submit the specifications of the industrial device assembly through an approval cycle. Additionally, after the industrial device assembly has been manufactured and shipped to the industrial site, the industrial device assembly and human machine interfaces (HMIs) associated with the industrial device assembly may be manually programmed and configured for use at the industrial site. Altogether, this process is arduous and time-consuming and may often contribute to long delays on a particular project at the industrial site. As such, it may be useful to provide systems and methods for automatically commissioning the industrial device assembly to minimize manual programming and configuration of the industrial device assembly.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system has a processor that may receive an order of an industrial device assembly having multiple industrial automation devices. The processor may also generate a first data file based on the order of the industrial device assembly. The first data file may have specification data associated with each industrial automation device and hierarchical information associated with each industrial automation device. Additionally, the processor may generate a second data file based on the first data file. The second data file has one or more control blocks of code associated with each industrial automation device. Further, the processor may transmit the second data file to a control system associated with the industrial device assembly. The control system is automatically programmed based on the second data file to control one or more operations of each industrial automation device in the industrial device assembly.

In another embodiment, a method may include receiving, via a control system associated with an industrial device assembly, a data file that has one or more control blocks of code associated with each industrial automation device in the industrial device assembly after the industrial device assembly has been manufactured but before the industrial device is shipped to an industrial site from a manufacturing site. The method also includes automatically programming the control system associated with the industrial device assembly based on the data file to control one or more operations of each industrial automation device in the industrial device assembly.

In another embodiment, a non-transitory computer-readable medium has computer-executable instructions that, when executed, may cause a processor to receive an order of an industrial device assembly having multiple industrial automation devices. The processor may also generate a first data file based on the order of the industrial device assembly and generate a second data file based on the first data file. The first data file has specification data associated with each industrial automation device, and the second data file has one or more control blocks of code associated with each industrial automation device. Additionally, the processor may generate an object model associated with the industrial device assembly based on the first data file and the second data file. The object model is populated with each type of industrial automation device as respective object types. Further, the processors may transmit the second data file to a control system associated with the industrial device assembly. The control system is automatically programmed based on the second data file to control one or more operations of each industrial automation device in the industrial device assembly after the industrial device assembly is manufactured but before the industrial device assembly is shipped to an industrial site.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the embodiments described herein will become better understood when the following detailed description is read with reference to the accompanying drawings in which like characters represent like parts throughout the drawings, wherein.

DETAILED DESCRIPTION

Figure 1:
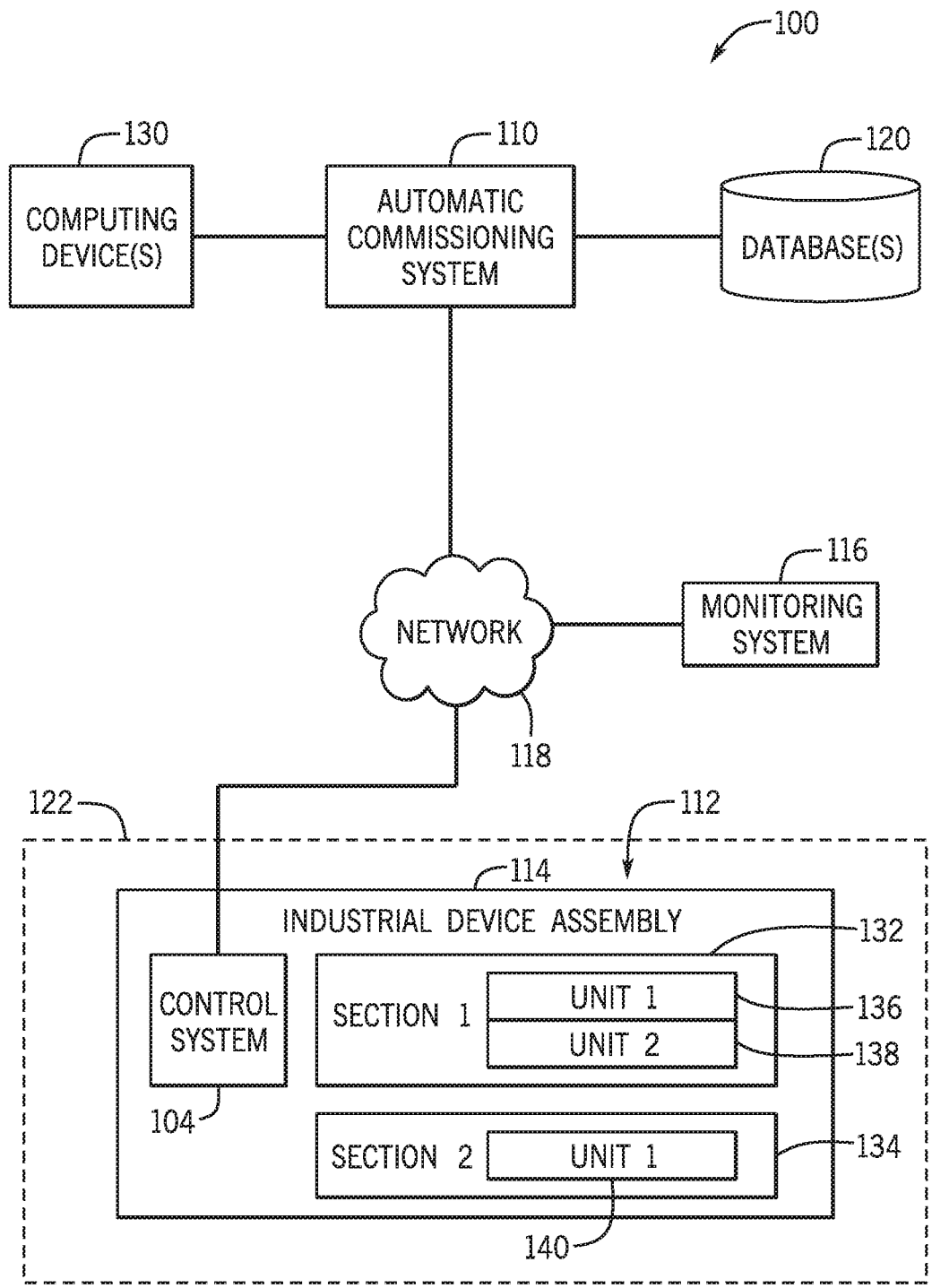
FIG. 1 illustrates a block diagram of an industrial communication system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Industrial systems may include various types of industrial device assemblies, such as motor control centers (MCCs), switchgear assemblies, and the like. Such industrial device assemblies are typically custom ordered from a manufacturer for a particular industrial site. Before submitting the order for a particular industrial device assembly, the customer may define specifications of the industrial device assembly and submit the specifications of the industrial device assembly through an approval cycle. Additionally, after the industrial device assembly has been manufactured and shipped to the industrial site, the industrial device assembly and human machine interfaces (HMIs) associated with the industrial device assembly have to be manually programmed and configured for use at the industrial site. Altogether, this process is arduous and time-consuming and may often contribute to long delays on a particular project at the industrial site. For example, the industrial device assembly may be subdivided into lineups, sections, units, or the like. Each lineup may have 1 through N sections and each section may have 1 through M units, which respectively contain at least one industrial automation device. As such, it may be desirable to automatically commission the industrial device assembly before the industrial device assembly arrives at the industrial site by pre-programming a controller of the industrial device assembly with one or more control blocks of code that correspond to each industrial automation device of the industrial device assembly and mapping each control block of code to a respective human machine interface (HMI) visualization.

Accordingly, embodiments of the present disclosure are generally directed to an automatic commissioning system that receives a customer's order of an industrial device assembly and generates a first data file that includes specification data of the industrial device assembly based on the customer's order of the industrial device assembly. For example, the specifications of the industrial device assembly may include identification information of each industrial automation device, a reference number of each industrial automation device, switch information and port information associated with each industrial automation device, internet protocol (IP) addresses associated with each industrial automation device, a firmware version associated with each industrial device, parameter data associated with each industrial device, or the like. The automatic commissioning system then generates a second data file that contains one or more control blocks of code associated with each industrial automation device of the industrial device assembly based on the first data file. In one embodiment, the second data file may be used to automatically pre-program a controller of the industrial device assembly to control each industrial automation device of the industrial device assembly, such that after the industrial device assembly arrives at an industrial site, the industrial device assembly is operationally-ready for use. In another embodiment, after the industrial device assembly arrives at the industrial site, the controller of the industrial device assembly may download the second data file, which would facilitate automatic programming of the controller of the industrial device assembly with control blocks of code to control corresponding industrial automation devices within the industrial device assembly.

Additionally, the automatic commissioning system may map the control blocks of code within the second data file to one or more HMI visualizations associated with each industrial automation device of the industrial device assembly. In one embodiment, the automatic commissioning system may map each control block of code within the second data file to the corresponding HMI visualization as the control block of code is inserted into the second data file (i.e., in parallel). In another embodiment, the automatic commissioning system may map each control block of code within the second data file to the corresponding HMI visualization after each control block of code for each industrial automation device has been inserted into the second data file. In any case, after the controller of the industrial device assembly has been programmed with the second data file and the industrial device assembly has been installed at the industrial site, any suitable HMI associated with the industrial device assembly may automatically display the HMI visualization that corresponds to the industrial automation device of interest to a user.

Further, the automatic commissioning system may facilitate the generation of various models of the industrial device assembly, such as a hierarchical model of the industrial device assembly, a networking model of the industrial device assembly, or the like. Based on the first data file and the second data file, the automatic commissioning system may generate such models to facilitate monitoring and analysis of an industrial automation device of the industrial device assembly, a section of the industrial device assembly, a lineup of the industrial device assembly, or the like. For example, the performance of a particular industrial automation device of the industrial device assembly may be compared to a baseline performance of the industrial automation device or to the performance of another industrial automation device of the industrial device assembly. In one embodiment, the automatic commissioning system may generate a model based on the first data file and store the model in a database. After the industrial device assembly has been installed at the industrial site, one or more industrial automation devices or one or more sensors associated with the industrial automation devices may transmit data directly to the model in the database. The transmitted data may then be historized within within the model. The automatic commissioning system may also persist (e.g., transmit) the models to application platforms that provide additional tools for monitoring the status of each industrial automation device, analyzing the performances of each industrial automation device, or the like. As such, the automatic commissioning system may facilitate a more efficient (e.g., time) commissioning and startup process of an industrial device assembly by automatically programming and configuring the controller of the industrial device assembly before the industrial device assembly has arrived at the industrial site or upon installation of the industrial device assembly at the industrial site. In this way, the automatic commissioning system facilitates a reduction in the amount of time required to commission an industrial device assembly, a minimization in the amount of programming and upstart tasks a customer manually performs with regard to commissioning the industrial device assembly, and a reduction in the amount of possible programming errors that may occur due manual programming and configuration of the industrial device assembly. Additional details regarding the automatic commissioning system will be discussed below with reference to FIGS. 1-4.

By way of introduction, FIG. 1 illustrates a block diagram of an exemplary industrial communication system 100, in accordance with embodiments presented herein. The industrial communication system 100 may include an automatic commissioning system 110 that receives a customer order of an industrial device assembly 112 from a computing device 130. For example, the customer order of the industrial device assembly 112 may include an order of a motor control center, a switchgear assembly, a data center, a power control room, or the like. In one embodiment, the customer order of the industrial device assembly 112 may be received from an assembly builder software application executing on the computing device 130. In another embodiment, the assembly builder software application may be hosted on a remote computing device and accessed via a web browser of the computing device 130 by the customer or other user of the computing device 130. For example, the assembly builder software application may be hosted by a server device of the automatic commissioning system 110 that is communicatively coupled to the computing device 130. It should be noted that any suitable network may be employed in the embodiments described herein. For instance, network 118 may include any wired or wireless network that may be implemented as a local area network (LAN), a wide area network (WAN), and the like. Other industrial communication network protocols may also be used, such as EtherNet/IP, ControlNet, DeviceNet, and the like. In any case, the network 118 may permit the exchange of data in accordance with a protocol.

The automatic commissioning system 110 may generate a first data file (e.g., a configuration file) based on the customer's order of the industrial device assembly 112 that includes specification data associated with each industrial automation device of the industrial device assembly 112. In one embodiment, the automatic commissioning system 110 include a configuration application that receives the customer's order of the industrial device assembly 112 and generates the first data file. The first data file may contain a hierarchical map of each industrial automation device within the industrial device assembly 112 and one or more key attributes associated with each industrial automation device. For example, the automatic commissioning system 110 may retrieve various types of data associated with each industrial automation device from a database 120 and populate the first data file with the retrieved data. It should be noted that the database 120 may be a proprietary database that exclusively communicates with the automatic commissioning system 110 or other devices through a certain proprietary protocol. Additionally, although the embodiments discussed herein refer to the database 120 as a singular database, it should be understood that in some embodiments, the database 120 may include more than one database.

The database 120 may index an industrial automation device based on a serial number or other identifier, the vendor code, the product code, the internet protocol (IP) address, or the like, associated with an industrial automation device. The database 120 may also store a firmware version associated with each industrial automation device and various parameter types associated with each industrial automation device. After the first data file has been generated, the automatic commissioning system 110 may upload the first data file to the database 120 for storage.

The automatic commissioning system 110 may also generate a second data file that contains one or more control blocks of code associated with each industrial automation device listed as part of the industrial device assembly 112 according to the first data file. For example, the automatic commissioning system 110 may retrieve a control block of code associated with each industrial automation device indicated in the first data file from the database 120 and generate the second data file with the retrieved control block of code. The database 120 may index a control block of code with an identifier of each type of industrial automation device. For example, the industrial automation devices may include controllers, input/output (I/O) modules, motors, human machine interfaces (HMIs), operator interfaces, contactors, starters, sensors, drivers, relays, protection devices, switchgears, compressors, network switches (e.g., Ethernet switches, modular-managed, fixed-managed, service-router, industrial, unmanaged, etc.), and the like.

In some embodiments, the database 120 may act as a repository for one or more different libraries of code. For example, the database 120 may include one or more libraries of code associated with using one or more industrial automation devices for respective types of industrial control systems, such as process control systems, manufacturing control systems, material handling systems, or the like, or include a library of customer-specific control code for each type of industrial automation device. Additionally, the automatic commissioning system 110 may map each control block of code within the second data file to a corresponding HMI visualization in the database 120. In this way, upon installation of the industrial device assembly 112 at the industrial site 122, HMIs at the industrial site 122 may automatically be configured to display HMI visualizations. For example, the database 120 may index one or more HMI visualizations with each type of industrial automation device. The automatic commissioning system 110 may then tag each control block of code within the second data file with a respective HMI visualization identifier based on the type of industrial automation device associated with the control block of code. After the second data file has been generated, the automatic commissioning system 110 may upload the second data file to the database 120 for storage.

As mentioned above, in one embodiment, the automatic commissioning system 110 may transmit the second data file to a control system 104 of the industrial device assembly 112 to automatically pre-program the control system 104 based on the control blocks of code in the second data file before the industrial device assembly 112 arrives at the industrial site 122. As such, the automatic commissioning system 110 may send the second data file to the control system 104 of the industrial device assembly 112 after the industrial device assembly 112 is manufactured and is functional but before shipment of the industrial device assembly 112 to the industrial site 122. In another embodiment, after the industrial device assembly 112 arrives at the industrial site 122, the control system 104 of the industrial device assembly 112 may download the second data file via the network 118 and initialize the respective devices with the respective control blocks of code. For example, the automatic commissioning system 110 may receive an indication that the industrial device assembly has been installed at the industrial site and transmit the second data file to the control system 104 of the industrial device assembly 112. In another embodiment, the automatic commissioning system 110 may be implemented by the customer on their local network. In such an embodiment, the customer may make changes to the automatic commissioning system 110 as part of the customer's life cycle management. In any case, the automatic commissioning system 110 may be communicatively coupled to the control system 104 of the industrial device assembly 112 to receive the second data file that may be used to subsequently program the control system 104 of the industrial device assembly 112.

The automatic commissioning system 110 may also be communicatively coupled to a monitoring system 116. The monitoring system 116 may include one or more computing devices for monitoring one or more industrial automation devices of the industrial device assembly 112 at the industrial site 122. The automatic commissioning system 110 may generate one or more models (e.g., object models) of the industrial device assembly 112 and the industrial automation devices of the industrial device assembly 112. For example, the automatic commissioning system 110 may generate a hierarchical model of the industrial device assembly 112 that provides the location of each industrial automation device in the industrial device assembly 112 in relation to each other industrial automation device in the industrial device assembly 112. The automatic commissioning system 110 may also generate a network model of the industrial device assembly 112 that provides a network status of each industrial automation device, each switch, and each port of the industrial device assembly 112. The automatic commissioning system 110 may then store the generated models in the database 120 and link the generated models with the control system 104 of the industrial device assembly 112. After the industrial device assembly 112 has been installed at the industrial site 122, the control system 104 of the industrial device assembly 112 and/or the monitoring system 116 may store parameter data (e.g., real-time data) associated with each industrial automation device in the models in the database 120. The monitoring system 116 may then use the data to update the models and perform one or more analyses on the recently acquired data. For example, the monitoring system 116 may determine one or more operational parameters (e.g., power consumption) associated with one or more industrial automation devices or perform one or more statistical analyses (e.g., a sum, a min, a max, or the like) associated with two or more of the industrial automation devices. In certain embodiments, the automatic commissioning system 110 and the monitoring system 116 may be part of the same system.

It should be noted that, the computing device 130 may be any suitable computing device that includes communication abilities, processing abilities, and the like. For example, the computing device 130 may be any general computing device that may facilitate submission of the customer's order of an industrial device assembly 112 in a software application. It should be noted that the automatic commissioning system 110 and the monitoring system 116 may also be any suitable computing device like the computing device 130. As such, the automatic commissioning system 110, the monitoring system 116, and/or the computing device 130 may be a general-purpose computer, a mobile computing device, a laptop-computing device, a tablet computing device, a wearable computing device (e.g., a smartwatch), and the like. Additional details with regard to the automatic commissioning system 110 will be discussed below with reference to FIG. 2.

As described above, the industrial device assembly 112 may be subdivided into one or more lineups, one or more sections within each lineup, and one or more units within each section. Each unit of the industrial device assembly 112 may contain one or more industrial automation devices that may include a component or a part that performs a specific operation for the industrial device assembly 112. As illustrated in FIG. 1, the industrial device assembly 112 may be installed at a particular industrial site 122 and may contain a lineup 114 having a first section 132 that contains two units 136, 138 and a second section 134 that contains one unit 140. It should be noted that the illustrated embodiment is intended to be non-limiting and that an industrial site 122 may include any suitable number of industrial device assemblies 112 that have been ordered by a customer. Additionally, each industrial device assembly 112 may have any suitable number of lineups, any suitable number of sections within each lineup, any suitable number of units within each section, and the like.

The industrial device assembly 112 at the industrial site 122 may take many forms and may include industrial automation devices for accomplishing many different and varied purposes. For example, the industrial device assembly 112 may include machinery used to perform various operations in a compression station, an oil refinery, a batch operation for making food items, a mechanical assembly line, and the like. Accordingly, the industrial device assembly 112 may include a variety of operational components, such as electric motors, valves, actuators, temperature elements, pressure sensors, networking sensors, or a myriad of machinery or devices used for manufacturing, processing, material handling, and other applications.

Figure 2:
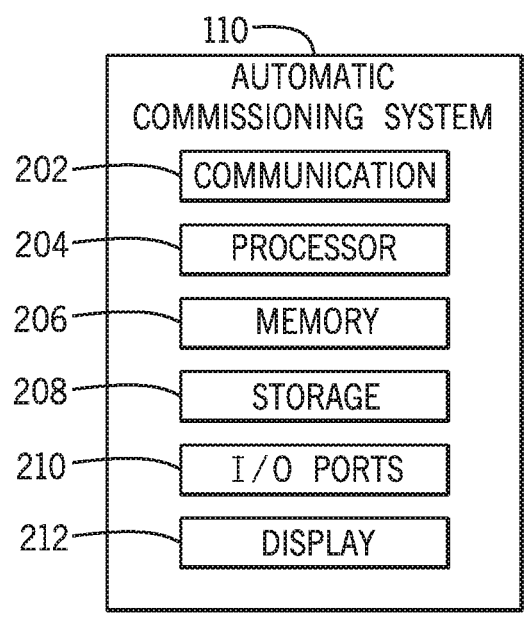
FIG. 2 illustrates a block diagram of an automatic commissioning system employed by the industrial communication system of FIG. 1, in accordance with embodiments described herein.

To perform some of the actions set forth above, the automatic commissioning system 110 may include certain embodiments to facilitate these actions. FIG. 2 is a block diagram of example components within the automatic commissioning system 110. For example, the automatic commissioning system 110 may include a communication component 202, a processor 204, a memory 206, a storage 208, input/output (I/O) ports 210, a display 212, and the like. The communication component 202 may be a wireless or wired communication component that may facilitate communication between the monitoring system 116, the database 120, the computing device 130, the control system 104, and the like. Additionally, the communication component 202 may facilitate data transfer to and from the automatic commissioning system 110, such that the automatic commissioning system 110 may receive the customer's order of the industrial device assembly 112 from the computing device 130, various types of specification data from the database 120, and various types of control blocks of code from the database 120.

The processor 204 may be any type of computer processor or microprocessor capable of executing computer-executable code. The processor 204 may also include multiple processors that may perform the operations described below. The memory 206 and the storage 208 may be any suitable articles of manufacture that can serve as media to store processor-executable code, data, or the like. These articles of manufacture may represent computer-readable media (e.g., any suitable form of memory or storage) that may store the processor-executable code used by the processor 204 to perform the presently disclosed techniques. The memory 206 and the storage 208 may also be used to store data, consumer models, various other software applications, and the like. The memory 206 and the storage 208 may represent non-transitory computer-readable media (e.g., any suitable form of memory or storage) that may store the processor-executable code used by the processor 204 to perform various techniques described herein. It should be noted that non-transitory merely indicates that the media is tangible and not a signal.

The I/O ports 210 may be interfaces that couple to other peripheral components, such as input devices (e.g., keyboard, mouse), sensors, I/O modules, and the like. The display 212 may operate to depict visualizations associated with software or executable code being processed by the processor 204. In one embodiment, the display 212 may be a touch display capable of receiving inputs from a user of the automatic commissioning system 110. The display 212 may be any suitable type of display, such as a liquid crystal display (LCD), plasma display, or an organic light emitting diode (OLED) display, for example. Additionally, in one embodiment, the display 212 may be provided in conjunction with a touch-sensitive mechanism (e.g., a touch screen) that may function as part of a control interface for the automatic commissioning system 110.

It should be noted that the components described above with regard to the automatic commissioning system 110 are exemplary components and the automatic commissioning system 110 may include additional or fewer components as shown. Additionally, it should be noted that the monitoring system 116 and the computing device 130 may also include similar components as described as part of the automatic commissioning system 110.

Figure 3:
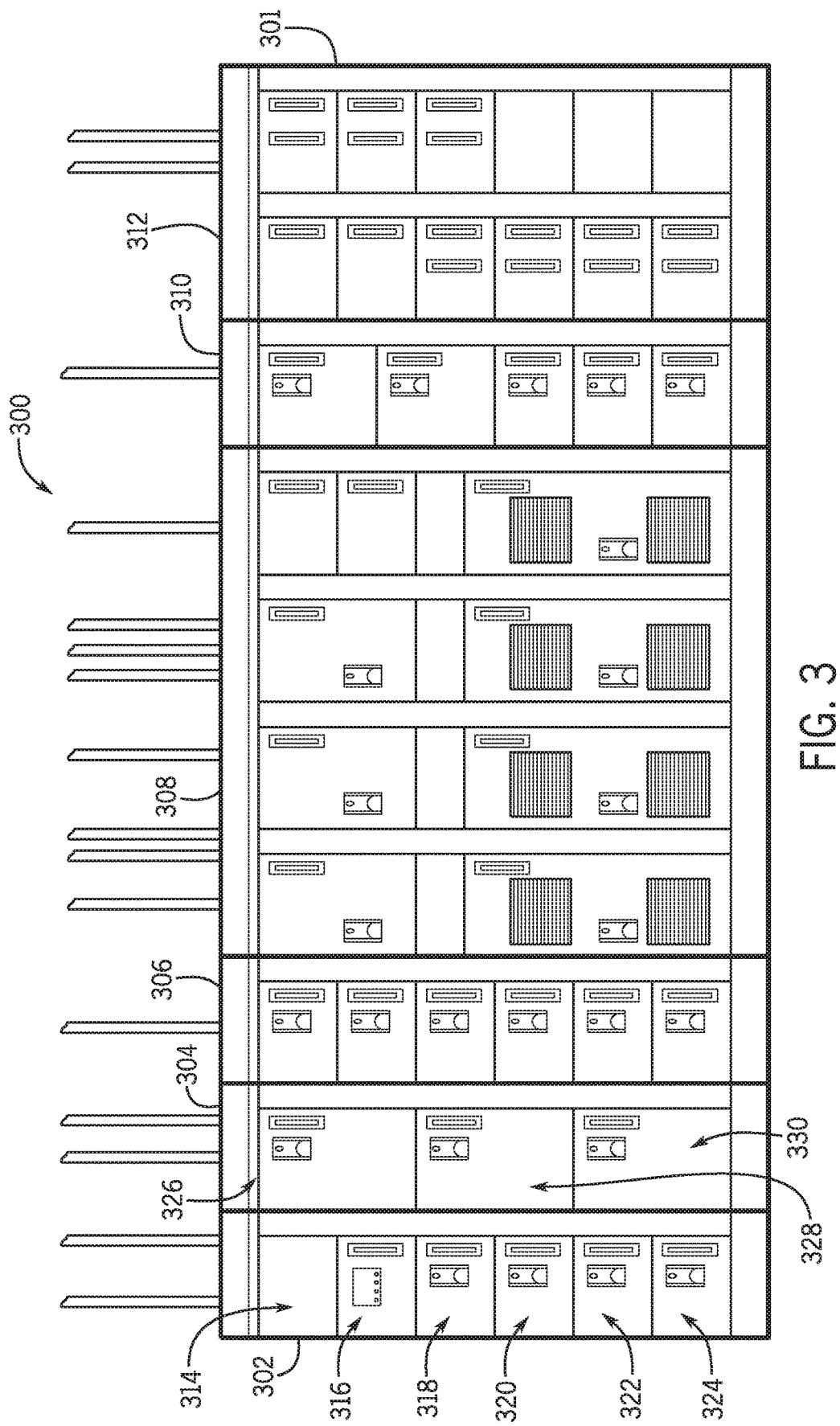
FIG. 3 illustrates an industrial device assembly that may communicate with the automatic commissioning system of FIG. 1, in accordance with embodiments described herein.

As described above with regard to FIG. 1, an industrial device assembly may be subdivided into one or more lineups, one or more sections, one or more units, or the like. For example, each lineup may have 1 through N sections and each section may have 1 through M units, which respectively contain one or more industrial automation devices. FIG. 3 illustrates an exemplary embodiment of an industrial device assembly 300, such as a motor control center, a switchgear assembly, or the like, having a plurality of industrial automation devices located within the industrial device assembly 300. In the illustrated embodiment, the industrial device assembly 300 has a lineup 301 of a plurality of sections 302, 304, 306, 308, 310, 312. For example, section 302 may include units 314, 316, 318, 320, 322, 324, and section 304 may include units 326, 328, 330. One or more industrial automation devices may be located in each unit of the industrial device assembly 300. For example, a motor starter may be located in unit 318 of section 302 of the industrial device assembly 300. In another example, a power monitor may be located in unit 316 of section 302 of the industrial device assembly 300.

As shown in FIG. 3, given the number industrial automation devices in each unit, section, and lineup of the industrial device assembly 300, it may be challenging for an individual to manually program a control system of the industrial device assembly 300 to control an operation of each industrial automation device of the industrial device assembly 300. Indeed, by generating a data file that may be used to automatically program the control system to control the operation of each industrial automation device of the industrial device assembly 300, the automatic commissioning system 110 may facilitate a more efficient commissioning and startup process of the industrial device assembly 300 by automatically programming and configuring the control system of the industrial device assembly 300 before the industrial device assembly 300 arrives at the industrial site 122 or upon installation of the industrial device assembly 300 at the industrial site 122. In this way, the automatic commissioning system 110 facilitates a reduction in the amount of time involved to commission an industrial device assembly 300, a minimization in the amount of programming and upstart tasks a customer manually performs with regard to commissioning the industrial device assembly 300, and a reduction in the amount of possible programming errors that may occur due manual programming and configuration of the industrial device assembly 300.

Figure 4:
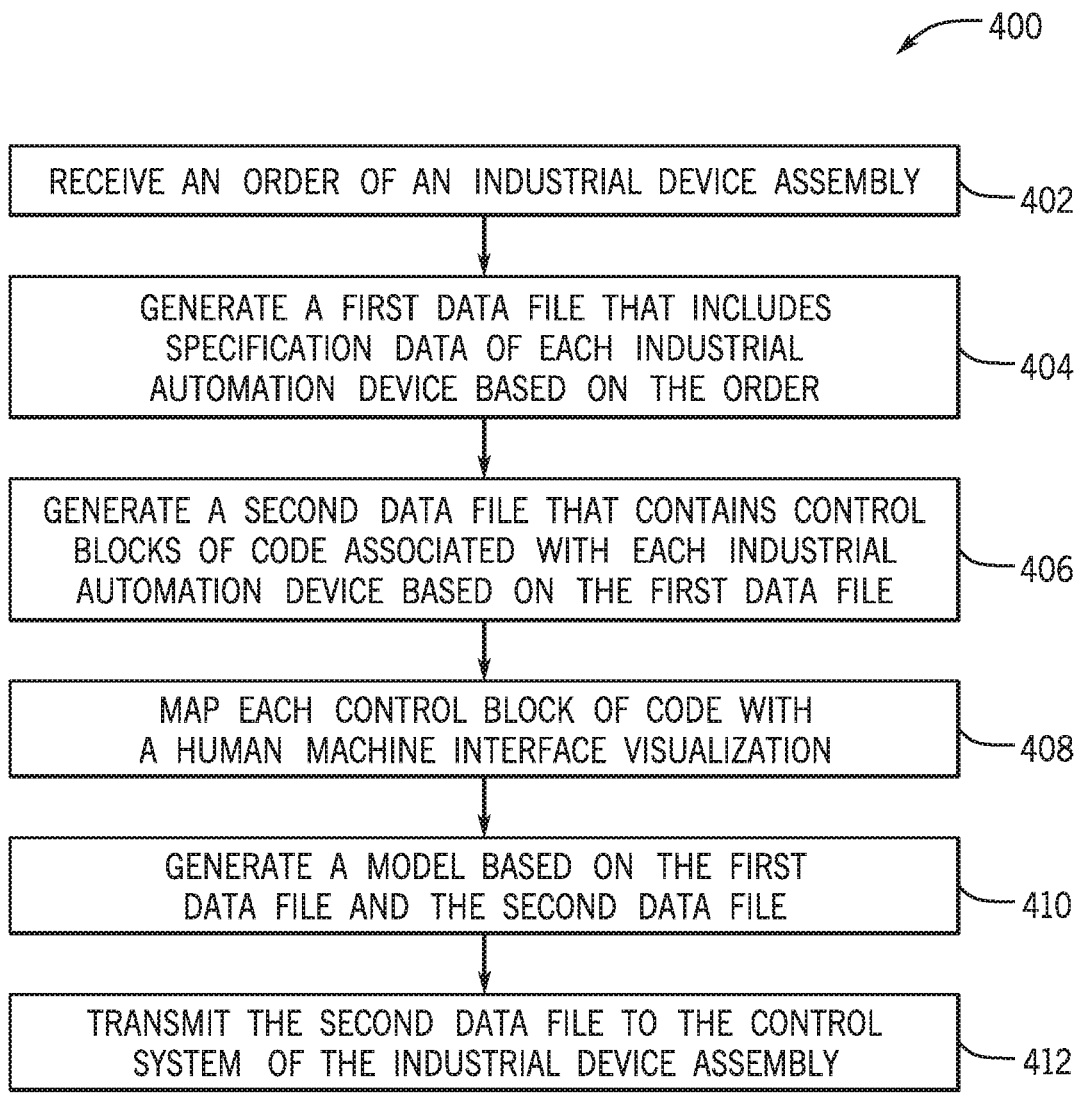
FIG. 4 illustrates a flow chart of a method for automatically commissioning an industrial device assembly, in accordance with embodiments described herein.

With the foregoing in mind, FIG. 4 illustrates a flow chart of a method 400 for programming a control system 104 of the industrial device assembly 112 to automatically control an operation of each industrial automation device of the industrial device assembly 112. Generally, the method 400 may include generating a first data file that includes specification data of an industrial device assembly 112 based on a customer's order of the industrial device assembly 112, generating a second data file that contains one or more control blocks of code associated with each industrial automation device of the industrial device assembly 112 based on the first data file, mapping the control blocks of code in the second data file to one or more HMI visualizations associated with each industrial automation device, generating various models of the industrial device assembly 112 based on the first data file and the second data file, and programming a control system 104 of the industrial device assembly 112 to automatically control an operation each industrial automation device of the industrial device assembly 112. Although the following description of the method 400 is described in a particular order, it should be noted that the method 400 is not limited to the depicted order, and instead, the method 400 may be performed in any suitable order. Moreover, although the method 400 is described as being performed by the automatic commissioning system 110, it should be noted that it may be performed by any suitable computing device.

As mentioned above, the method 400 may include the automatic commissioning system 110 receiving a customer's order of an industrial device assembly 112, generating a first data file that includes specification data of the industrial device assembly 112 based on the customer's order of the industrial device assembly 112, and generating a second data file that contains one or more control blocks of code associated with each industrial automation device of the industrial device assembly 112. After the control system 104 of the industrial device assembly receives the second data file, each control block of code in the second data file may automatically configure the control system 104 to be initialized to control respective operations of the industrial automation devices in the industrial device assembly 112. The automatic commissioning system 110 may also map each control block of code in the second data file with an HMI visualization associated with each industrial automation device of the industrial device assembly 112. Each HMI visualization may display one or more operational parameters associated with a corresponding industrial automation device, location information associated with the corresponding industrial automation device, network status information associated with the corresponding industrial automation device, or the like. The automatic commissioning system 110 may also program the control system 104 of the industrial device assembly 112 to control one or more operations of each industrial automation device of the industrial device assembly 112 based on the second data file. The automatic commissioning system 110 may then use the first data file and the second data file to generate various models of the industrial device assembly 112 for subsequent monitoring of the industrial device assembly 112. For example, the automatic commissioning system 110 may generate a hierarchical model of the industrial device assembly 112 that provides the location of each industrial automation device in the industrial device assembly 112 in relation to each other industrial automation device in the industrial device assembly 112. The automatic commissioning system 110 may also generate a network model of the industrial device assembly 112 that provides a network status of each industrial automation device, each switch, and each port of the industrial device assembly 112.

Keeping this in mind and referring to FIG. 4, at block 402, the automatic commissioning system 110 may receive an input data representative of a customer's order of an industrial device assembly 112 from a computing device 130. For example, the customer may submit the industrial device assembly 112 order into an assembly builder software application executing on the computing device 130. The assembly builder software application may provide one or more tools that facilitate selection of certain industrial automation devices for an industrial device assembly 112 and configuration of the selected industrial automation devices. In some embodiments, the industrial device assembly 112 order may include one or more industrial automation devices, one or more types of industrial automation devices, and location information associated with each industrial automation device in the industrial device assembly 112. After the customer has submitted the customer's order of the industrial device assembly 112 into the assembly builder software application, the assembly builder software application may send the customer's order to the automatic commissioning system 110.

After receiving the customer's order from the assembly builder software application, at block 404, the automatic commissioning system 110 may generate a first data file based on the customer's order that includes specification data associated with each industrial automation device of the industrial device assembly 112. For example, the specification data may include identification information of each industrial automation device, a quantity of each industrial automation device, a type of each industrial automation device, a location of each industrial automation device, or the like. In some embodiments, the first data file may include a JavaScript Object Notation (JSON) file, an Excel file, and/or the like. Based on each industrial automation device in the customer's order, the automatic commissioning system 110 may retrieve various types of data associated with each industrial automation device from the database 120 and generate the first data file with the retrieved data. For example, the first data file may be generated based on identification information of each industrial automation device, a quantity of each industrial automation device, switch information and port information associated with each industrial automation device, internet protocol (IP) addresses associated with each industrial automation device, a firmware version associated with each industrial automation device, various parameter types associated with each industrial automation device, or the like.

Additionally, the automatic commissioning system 110 may populate the first data file with location information of each industrial automation device in the industrial device assembly 112 based on the location information associated with the customer's order. In some embodiments, the location information of the first data file may include a location of each industrial automation device in the industrial device assembly 112 with respect to adjacent industrial automation devices, a unit identifier associated with the location of each industrial automation device, a section identifier associated with the location of each industrial automation device, a lineup identifier associated with the location of each industrial automation device, or the like.

The automatic commissioning system 110 may also populate the first data file with hierarchical information associated with each industrial automation device of the industrial device assembly 112 based on the customer's order. By way of example, the hierarchical information may include an array of switches associated with the industrial device assembly 112, identification information associated with each switch in the array (e.g., a switch identifier), an array of industrial automation devices associated with each switch, identification information associated with each industrial automation device, parameter data associated with each industrial automation device, or the like. In this way, the first data file may contain a hierarchical map of each industrial automation device in the industrial device assembly 112 and one or more key attributes associated with each industrial automation device. After the first data file has been generated, the automatic commissioning system 110 may upload the first data file to the database 120.

At block 406, the automatic commissioning system 110 may generate a second data file that contains one or more control blocks of code associated with each industrial automation device of the industrial device assembly 112 based on the first data file. In some embodiments, the second data file may include a project file that may be used with any suitable control logic platform or the like. Based on each industrial automation device listed in the first data file, the automatic commissioning system 110 may retrieve a control block of code associated with each industrial automation device from the database 120 and populate the second data file with the retrieved control block of code. Each control block of code in the second data file may be used to automatically configure the control system 104 to be initialized to control respective operations of the industrial automation devices in the industrial device assembly 112. For example, the database 120 may have one or more libraries of control code for various functions of the industrial device assembly 112 (e.g., for use with a process control system, a manufacturing control system, a material handling system, or the like). Based on the function of the industrial device assembly 112, the automatic commissioning system 110 may retrieve a corresponding control block of code from the database 120 for each industrial automation device in the industrial device assembly 112 and populate the second data file with the retrieved control block of code.

In certain embodiments, the automatic commissioning system 110 may retrieve a first control block of code associated with a first industrial automation device and a second control block of code associated with a second industrial automation device and generate the second data file with the first block of code and the second block of code. The automatic commissioning system 110 may tag or associate the first block of code with an identifier of the first industrial automation device and the second block of code with an identifier of the second industrial automation device in the second data file. The automatic commissioning system 110 may also populate the second data file with identification information associated with each industrial automation device, an IP address associated with each industrial automation device, one or more operational parameters associated with each industrial automation device, and the like. After the second data file has been generated, the automatic commissioning system 110 may upload the second data file to the database 120.

In one embodiment, the second data file may be used to automatically pre-program the control system 104 of the industrial device assembly 112 based on the control blocks of code before the industrial device assembly 112 arrives at the industrial site 122 or after the industrial device assembly 112 has completed at least a part of its manufacturing process. In this way, upon installation of the industrial device assembly 112 at the industrial site 122, the control system 104 of the industrial device assembly 112 may automatically be initialized to control one or more operations of each industrial automation device in the industrial device assembly 112 without further programming or configuration (i.e., the industrial device assembly 112 is in an operationally-ready state after installation). In another embodiment, after the industrial device assembly 112 arrives at the industrial site 122, the control system 104 of the industrial device assembly 112 may download the second data file via the network 118. The second data file may then be used to automatically program the control system 104 of the industrial device assembly 112 with the control blocks of code in the second data file to control the corresponding industrial automation devices of the industrial device assembly 112. In this way, programming and configuration tasks during commissioning of the industrial device assembly 112 are minimized.

In certain embodiments, the data within the second data file may be organized by each industrial automation device in the industrial device assembly 112. For example, the second data file may include a list of each industrial automation device in the industrial device assembly 112 or a table of each industrial automation device in the industrial device assembly 112 based on each industrial automation device listed in the first data file. As described above, each listing of a respective industrial automation device may be associated with a control block of code that may be used to program the control system 104 of the industrial device assembly 112 to control respective operations of the industrial automation devices. Each listing of a respective industrial automation device may also be associated with or tagged with a particular HMI visualization associated with a particular type of each industrial automation device. In this way, after the control system 104 receives the second data file, the control system 104 may be automatically programmed based on the second data file to control respective operations of the industrial automation devices and facilitate the display of HMI visualizations at HMI interfaces at an industrial site with minimal additional programming and configuration.

Additionally, although certain embodiments described herein refer to generating a first data file based on the customer's order that includes specification data associated with each industrial automation device of the industrial device assembly 112 and generating a second data file that contains one or more control blocks of code associated with each industrial automation device of the industrial device assembly 112 based on the first data file, it should be understood that in other embodiments, the first data file and the second data file may be generated as a single data file. That is, the method 400 at blocks 404 and 406 may be performed by the automatic commissioning system 110 to simultaneously or nearly simultaneously generate a single data file that contains the specification data associated with each industrial automation device of the industrial device assembly 112 and the one or more control blocks of code associated with each industrial automation device of the industrial device assembly 112. For example, the automatic commissioning system 110 may retrieve various types of data associated with each industrial automation device, as described above, and one or more control blocks of code at the same time or nearly the same time and generate a single data file based on the retrieved data and code.

After the automatic commissioning system 110 retrieves the second data file with control blocks of code for each industrial automation device of the industrial device assembly 112, at block 408, the automatic commissioning system 110 may map each control block of code associated with an industrial automation device in the second data file to a corresponding HMI visualization, if applicable. For example, after installation of the industrial device assembly 112 at the industrial site 122, a user may view an HMI visualization associated with an industrial automation device of interest to the user via an HMI component disposed in the industrial site 122. The HMI visualization may provide details regarding various properties of one or more industrial automation devices. For example, the HMI visualization may include an indication of a location of the industrial automation device in the industrial device assembly 112 with respect to adjacent industrial automation devices, maintenance data associated with the industrial automation device, performance data associated with the industrial automation device, a device tree indicative of the physical location of the industrial automation device in the industrial device assembly 112, a device map indicative of physical layout or physical position of the industrial automation device and nearby industrial automation devices in the industrial device assembly 112, or the like. In one embodiment, HMI visualization code for generating a corresponding HMI visualization may be indexed in the database 120 by an HMI visualization identifier. The HMI visualization code may also be associated with one or more industrial automation device identifiers. Based on each industrial automation device identifier associated with each control block of code in the second data file, the automatic commissioning system 110 may retrieve the corresponding HMI visualization code from the database 120. For example, the HMI visualization code may be indexed with the corresponding industrial automation device identifier and the control block of code.

As mentioned above, the second data file may be used to automatically program the control system 104 of the industrial device assembly 112 before the industrial device assembly 112 arrives at the industrial site 122. Since each industrial automation device identifier and each control block of code is mapped to a corresponding HMI visualization in the second data file, the customer (e.g., a user) may automatically launch a particular HMI visualization associated with an industrial automation device of interest at an HMI interface associated with the industrial device assembly 112 after installation of the industrial device assembly 112 at the industrial site 122. For example, the HMI interface may request HMI visualization code for the particular HMI visualization associated with the industrial device assembly 112 or a particular industrial automation device of the industrial device assembly 112 from the control system 104. The control system 104 or the automatic commissioning system 110 may send the HMI visualization code, one or more HMI objects associated with the HMI visualization code, or both, to the HMI interface in response to receiving the request. The HMI interface may then automatically generate and display the HMI visualization based on the received HMI visualization code, HMI objects, or both.

In one embodiment, the automatic commissioning system 110 may map each control block of code within the second data file to the corresponding HMI visualization as the second data file is populated with the control block of code. That is, the automatic commissioning system 110 may perform blocks 406 and 408 in parallel. For instance, after the automatic commissioning system 110 generates the second data file with a first control block of code, the automatic commissioning system 110 may map the first control block of code with a corresponding HMI visualization. The automatic commissioning system 110 may also generate the second data file with a second control block of code as the automatic commissioning system 110 maps the first control block of code with the corresponding HMI visualization. In this way, the automatic commissioning system 110 may efficiently generate the second data file, thereby reducing the commissioning time of the industrial device assembly 112.

After the automatic commissioning system 110 has mapped each control block of code within the second data file with a corresponding HMI visualization, at block 410, the automatic commissioning system 110 may generate one or more models that may facilitate monitoring of the industrial device assembly 112 and the industrial automation devices of the industrial device assembly 112 after the industrial device assembly 112 has been installed at the industrial site 122. The automatic commissioning system 110 may generate an object model (e.g., an asset model or an industrial automation device model) of each industrial automation device in the industrial device assembly 112. For example, the object model may describe or define the industrial device assembly 112 in relation to the industrial automation devices in the industrial device assembly 112. The object model may include one or more objects defining respective industrial automation devices in the industrial device assembly 112. Based on the first data file and the second data file, the automatic commissioning system 110 may determine the device identifier of each industrial automation device in the industrial device assembly 112, the IP address associated with each industrial automation device, a type of each industrial automation device, or the like. The automatic commissioning system 110 may then populate the object model with each type of industrial automation device as respective object types. The automatic commissioning system 110 may then associate each object type of the industrial automation devices with a number of parameters or attributes based on each type of the industrial automation devices.

In one embodiment, the object model may include a network logical model that defines or shows which industrial automation devices in the industrial device assembly 112 are connected to one or more ethernet switches. For example, an HMI component disposed in the industrial site 122 may access the network logical model and display an asset modeling view or a network topology view of the industrial device assembly 112, or a portion thereof. In this way, the network logical model may facilitate traffic characterization and normalization modeling of the industrial device assembly 112 or one or more industrial automation devices within the industrial device assembly 112.

After generating the object model, the automatic commissioning system 110 may link the object model with the control system 104 of the industrial device assembly 112. As such, after the industrial device assembly 112 has been installed at the industrial site 122, the control system 104 of the industrial device assembly 112 may store parameter data (e.g., current, voltage, frequency, speed, temperature, power consumption, or the like) in the object model for monitoring each industrial automation device in the industrial device assembly 112. For example, during operation of the industrial device assembly 112, the control system 104 of the industrial device assembly 112 may receive real-time parameter data from one or more sensors associated with one or more industrial automation devices of the industrial device assembly 112 and update the object model with the real-time parameter data of each industrial automation device in the industrial device assembly 112.

In one embodiment, the object model generated by the automatic commissioning system 110 may include a hierarchical model of the industrial device assembly 112. For example, based on the location information of each industrial device in the industrial device assembly 112 (e.g., a unit identifier, a section identifier, a lineup identifier, or a combination thereof) in the first data file and the second data file, the automatic commissioning system 110 may arrange the identifier of each industrial automation device in the industrial device assembly 112 into the hierarchical model visualization, such as a device tree. The device tree may provide the location of a particular industrial automation device in relation to other industrial automation devices in the industrial device assembly 112. That is, the device tree may include the unit identifier of each industrial automation device to identify a unit storing the industrial automation device, the section identifier of each industrial automation device to identify a section having the industrial automation device, the lineup identifier of each industrial automation device to identify a lineup where the industrial automation device is located, or a combination thereof.

After the hierarchical model of the industrial device assembly 112 has been generated, the automatic commissioning system 110 may store the hierarchical model in the database 120. The automatic commissioning system 110 may then associate the identifier of each industrial automation device in the hierarchical model with the corresponding industrial automation device of the industrial device assembly 112. For example, during operation of the industrial device assembly 112, the control system 104 of the industrial device assembly 112 may receive real-time parameter data from one or more sensors associated with each industrial automation device of the industrial device assembly 112. The control system 104 may then transmit the real-time parameter data to the database 120, such that the database 120 may store the real-time parameter data associated with each industrial automation device with the corresponding identifier of the industrial automation device in the hierarchical model. Additionally, the monitoring system 116 may access the data in the hierarchical model and perform one or more analyses on the accessed data. For example, based on the accessed data, the monitoring system 116 may determine one or more operational parameters (e.g., power consumption, or the like) associated with each industrial automation device, one or more operational parameters associated with each section of industrial automation devices, one or more operational parameters associated with each lineup of industrial automation devices, one or more operational parameters associated with a type of industrial automation device, or the like. The monitoring system 116 may also perform one or more statistical analyses (e.g., a sum, a min, a max, or the like) for a type of industrial automation device, a section of industrial automation devices, a lineup of industrial automation devices or the like, based on the accessed data or compare one or more operational parameters of an industrial automation device with another industrial automation device, one or more operational parameters of a type of industrial automation device with another type of industrial automation device, one more operational parameters of a section of industrial automation devices with another section of industrial automation devices, one or more operational parameters of a lineup of industrial automation devices with another lineup of industrial automation devices, or the like.

In another embodiment, the object model generated by the automatic commissioning system 110 may include a network model of the industrial device assembly 112. The network model of the industrial device assembly 112 may provide the network status of each industrial automation device, each switch, and each port of the industrial device assembly 112. For example, based on the IP addresses, the switch information, and the port information associated with each industrial automation device in the first data file, the automatic commissioning system 110 may generate the network model of the industrial device assembly 112, such as a network topology map. Upon display on an HMI interface, the network topology map of the industrial device assembly 112 may provide an indication of how each industrial automation device in the industrial device assembly 112 is communicatively connected to a respective switch or port in the industrial device assembly 112. The network topology of the industrial device assembly 112 may also provide a status indication (e.g., online, offline, fault, or the like) of each industrial automation device, each switch, and each port in the industrial device assembly 112.

After the network model of the industrial device assembly 112 has been generated, the automatic commissioning system 110 may store the network model in the database 120. The automatic commissioning system 110 may then associate the identifier of each industrial automation device, the identifier of each switch, and the identifier of each port in the network model with the corresponding industrial automation device, switch, or port of the industrial device assembly 112. For example, during operation of the industrial device assembly 112, the control system 104 may receive real-time parameter data from one or more network sensors associated with each industrial automation device (e.g., internal diagnostics capabilities built in each industrial automation device), each switch, or each port of the industrial device assembly 112. The control system 104 may then transmit the real-time parameter data to the database 120 such that the database 120 may store the real-time parameter data associated with each industrial automation device, each switch, or each port with a corresponding identifier of the industrial automation device, switch, or port in the network model.

The monitoring system 116 may then access the real-time parameter data in the network model and perform one or more analyses on the accessed data. For example, based on the accessed data, the monitoring system 116 may determine one or more networking parameters associated with each industrial automation device, each switch, or each port of the industrial device assembly 112. Such networking parameters may include the network status of each industrial automation device, each switch, or each port; ingress data traffic into each port; egress data traffic from each port; or the like. The monitoring system 116 may also perform various analyses on the accessed data. For example, the monitoring system 116 may determine whether changes in the networking parameters of the industrial device assembly 112 follow standard production models by comparing a baseline value of a networking parameter with a value of the networking parameter at a particular point in time after the baseline value of the network parameter was determined (e.g., a current value of the networking parameter).

In certain embodiments, the automatic commissioning system 110 may persist (e.g., transmit) a model generated at block 410 to one or more application platforms hosted by the monitoring system 116. The application platforms may provide additional tools for monitoring an operational parameter or a networking parameter of each industrial automation device, analyzing the historical parameter data or the real-time parameter data of each industrial automation device, or the like. For example, an application platform may generate and display web-based dashboards, various visualizations, various reports, or the like, based on data in the model. The dashboards, visualizations, and reports may provide historic parameter data, current parameter data, or both, associated with one or more operational parameters, one or more network parameters, or the like, of each industrial automation device. The dashboards, visualizations, and reports may also provide trends in the historic parameter data associated with one or more operational parameters, one or more network parameters, and the like.

After generating the models at block 410, the automatic commissioning system 110 may optionally transmit the second data file to the control system 104 of the industrial device assembly 112 at block 412. As mentioned above, the control system 104 may be automatically pre-programmed with the second data file based on the control blocks of code in the second data file that correspond to each industrial automation device within the industrial device assembly 112. As such, upon installation of the industrial device assembly 112 at the industrial site 122, the control system 104 may automatically control one or more operations of each industrial automation device in the industrial device assembly 112 without further programming or configuration.

By incorporating the embodiments described herein, the automatic commissioning system 110 may facilitate efficient commissioning and startup of an industrial device assembly 112 by automatically programming and configuring the controller of the industrial device assembly 112 before the industrial device assembly 112 has arrived at the industrial site 122 or upon installation of the industrial device assembly 112 at the industrial site 122. In this way, the automatic commissioning system 110 facilitates a reduction in the amount of time required to commission an industrial device assembly 112, a minimization in the amount of programming and upstart tasks a customer has to manually perform with regard to commissioning the industrial device assembly 112, and a reduction in the amount of possible programming errors that may occur due manual programming and configuration of the industrial device assembly 112.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
a processor configured to:
receive an order of an industrial device assembly, wherein the order comprises a plurality of industrial automation devices in the industrial device assembly and a respective location associated with each industrial automation device of the plurality of industrial automation devices in the industrial device assembly;
generate a first data file based on the order of the industrial device assembly, wherein the first data file comprises specification data associated with each industrial automation device of the plurality of industrial automation devices, the respective location associated with each industrial automation device of the plurality of industrial automation devices with respect to one or more adjacent industrial automation devices of the plurality of industrial automation devices, and a hierarchical map associated with each industrial automation device of the plurality of industrial automation devices;

retrieve one or more corresponding control blocks of code for each industrial automation device of the plurality of industrial automation devices from a database based on the first data file, wherein the database comprises one or more libraries of code comprising a plurality of control blocks of code associated with a plurality of types of industrial automation devices, and wherein the one or more libraries of code corresponds to the plurality of industrial automation devices;

generate a second data file based on the first data file and the one or more corresponding control blocks of code, wherein the second data file comprises the one or more corresponding control blocks of code associated with each industrial automation device of the plurality of industrial automation devices;

receive an indication that at least one of the plurality of industrial automation devices is installed; and transmit the second data file to a control system in response to receiving the indication, wherein the control system is automatically programmed based on the second data file to control one or more operations of each industrial automation device of the plurality of industrial automation devices in the industrial device assembly.

2. The system of claim 1, wherein the processor is configured to transmit the second data file to the control system after the industrial device assembly is manufactured but before the industrial device assembly is shipped to an industrial site.

3. The system of claim 1, wherein the processor is configured to map the one or more corresponding control blocks of code of the plurality of control blocks of code to a respective HMI visualization associated with a corresponding industrial automation device of the plurality of industrial automation devices.

4. The system of claim 1, wherein the processor is configured to generate the second data file by populating the second data file with the one or more corresponding control blocks of code and mapping the one or more corresponding control blocks of code to a respective HMI visualization associated with a corresponding industrial automation device of the plurality of industrial automation devices in parallel.

5. The system of claim 1, wherein the processor is configured to generate an object model associated with the industrial device assembly based on the first data file and the second data file, wherein the object model is populated with each type of industrial automation device of the plurality of industrial automation devices as respective object types.

6. The system of claim 5, wherein the object model comprises a hierarchical model of the industrial device assembly, the hierarchical model including location information associated with each industrial automation device of the plurality of industrial automation devices in the industrial device assembly in relation to one or more other industrial automation devices of the plurality of industrial automation devices in the industrial device assembly.

7. The system of claim 5, wherein the object model comprises a network model of the industrial device assembly, wherein the network model comprises switch information and port information associated with each industrial automation device of the plurality of industrial automation devices in the industrial device assembly.

8. The system of claim 5, wherein the object model is stored in the database, and wherein the processor is configured to:

receive real-time parameter data associated with each industrial automation device of the plurality of industrial automation devices from the control system of the industrial device assembly in response to receiving the indication; and populate the respective object types of each industrial automation device of the plurality of industrial automation devices in the object model with the real-time parameter data associated with each industrial automation device of the plurality of industrial automation devices.

9. The system of claim 5, wherein the processor is configured to:

receive real-time parameter data from each industrial automation device of the plurality of industrial automation devices in response to receiving the indication; and populate the respective object types of each industrial automation device of the plurality of industrial automation devices in the object model with the real-time parameter data.

10. The system of claim 1, wherein the specification data associated with each industrial automation device of the plurality of industrial automation devices comprises identification information associated with each industrial automation device of the plurality of industrial automation devices, respective reference numbers associated with each industrial automation device of the plurality of industrial automation devices, switch and/or port information associated with each industrial automation device of the plurality of industrial automation devices, respective internet protocol (IP) addresses associated with each industrial automation device of the plurality of industrial automation devices, respective firmware versions associated with each industrial automation device of the plurality of industrial automation devices, respective quantities associated with each industrial automation device of the plurality of industrial automation devices, respective types associated with each industrial automation device of the plurality of industrial automation devices, respective locations associated with each industrial automation device of the plurality of industrial automation devices with respect to the industrial device assembly, or a combination thereof.

11. A method, comprising:

transmitting, via a control system associated with an industrial device assembly, an indication that at least one of a plurality of industrial automation devices is installed at an industrial site;

receiving, via the control system associated with the industrial device assembly, a data file that includes one or more control blocks of code associated with each industrial automation device of the plurality of industrial automation devices in the industrial device assembly, wherein the data file is generated based on (1) a second data file comprising specification data associated with each industrial automation device of the plurality of industrial automation devices in the industrial device assembly and a hierarchical map associated with each industrial automation device of the plurality of industrial automation devices in the industrial device assembly and (2) the one or more control blocks of code, wherein the second data file is generated based on an order of assembling each industrial automation device of the plurality of industrial automation devices in the industrial device assembly and a respective location associated with each industrial automation device of the plurality of industrial automation devices in the industrial device assembly, wherein the one or more control blocks of code are retrieved from a database based on the second data file, and wherein the database comprises one or more libraries of code comprising a plurality of control blocks of code associated with a plurality of types of industrial automation devices, and wherein the one or more libraries of code corresponds to the plurality of industrial automation devices; and automatically programming the control system to control one or more operations of each industrial automation device of the plurality of industrial automation devices in the industrial device assembly based on the data file.

12. The method of claim 11, wherein the control system associated with the industrial device assembly is programmed to control the one or more operations of each industrial automation device of the plurality of industrial automation devices in the industrial device assembly based on the data file without further programming or configuration in response to receiving the indication.

13. The method of claim 11, comprising:
receiving, via the control system, real-time parameter data associated with one or more industrial automation devices of the plurality of industrial automation devices in the industrial device assembly from one or more sensors associated with the one or more industrial automation devices in response to receiving the indication.

14. The method of claim 13, comprising:
transmitting, via the control system, the real-time parameter data to the database, wherein the real-time parameter data populates an object model stored in the database, and wherein the object model comprises an object for each industrial automation device of the plurality of industrial automation devices in the industrial device assembly.

15. A non-transitory computer-readable medium comprising computer-executable instructions that, when executed, are configured to cause a processor to:
receive an order of an industrial device assembly, wherein the order comprises a plurality of industrial automation devices in the industrial device assembly;
generate a first data file based on the order of the industrial device assembly, wherein the first data file comprises specification data associated with each industrial automation device of the plurality of industrial automation devices;
retrieve one or more corresponding control blocks of code for each industrial automation device of the plurality of industrial automation devices from a database based on the first data file, wherein the database comprises one or more libraries of code comprising a plurality of control blocks of code associated with a plurality of types of industrial automation devices, and wherein the one or more libraries of code corresponds to the plurality of industrial automation devices;
generate a second data file based on the first data file and the one or more corresponding control blocks of code, wherein the second data file comprises the one or more corresponding control blocks of code associated with each industrial automation device of the plurality of industrial automation devices;
receive an indication that at least one of the plurality of industrial automation devices is installed; and
transmit the second data file to a control system in response to receiving the indication, wherein the control system is automatically programmed based on the second data file to control one or more operations of each industrial automation device of the plurality of industrial automation devices in the industrial device assembly after the industrial device assembly is manufactured but before the industrial device assembly is shipped to an industrial site.

16. The non-transitory computer-readable medium of claim 15, wherein the instructions cause the processor to:
generate an object model associated with the industrial device assembly based on the first data file and the second data file, wherein the object model is populated with each type of industrial automation device of the plurality of industrial automation devices as respective object types, and wherein the object model comprises a network model of the industrial device assembly, the network model comprising switch information and port information associated with each industrial automation device of the plurality of industrial automation devices in the industrial device assembly.

17. The non-transitory computer-readable medium of claim 16, wherein the instructions cause the processor to:
receive real-time data associated with one or more industrial automation devices of the plurality of industrial automation devices from the control system associated with the industrial device assembly after the industrial device assembly is shipped to the industrial site; and
update the object model with the real-time data associated with the one or more industrial automation devices.

18. The non-transitory computer-readable medium of claim 17, wherein the instructions cause the processor to perform a statistical analysis based on the real-time data stored in the object model, wherein the statistical analysis is associated with two or more industrial automation devices of the plurality of industrial automation devices having a same type, two or more industrial automation devices of the plurality of industrial automation devices in a shared section of the industrial device assembly, or two or more industrial automation devices of the plurality of industrial automation devices in a shared lineup of the industrial device assembly, or a combination thereof.

19. The non-transitory computer-readable medium of claim 17, wherein the instructions cause the processor to:
compare the real-time data associated with the one or more industrial automation devices in the object model with historical data associated with the one or more industrial automation devices; and
determine that the one or more industrial automation devices are operating according to standard models based on the comparison.

20. The non-transitory computer-readable medium of claim 16, wherein the object model comprises a hierarchical model of the industrial device assembly, the hierarchical model including location information associated with each industrial automation device of the plurality of industrial automation devices in the industrial device assembly in relation to one or more other industrial automation devices of the plurality of industrial automation devices in the industrial device assembly.

* * * * *